United States Patent
Boström et al.

(10) Patent No.: US 9,854,604 B2
(45) Date of Patent: *Dec. 26, 2017

(54) CONTROLLING RANDOM ACCESS FAILURE ON A SECONDARY CELL

(71) Applicant: Telefonaktiebolaget L M Ericsson (publ), Stockholm (SE)

(72) Inventors: Lisa Boström, Solna (SE); Magnus Stattin, Sollentuna (SE); Tobias Tynderfeldt, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 85 days.

This patent is subject to a terminal disclaimer.

(21) Appl. No.: 14/966,644

(22) Filed: Dec. 11, 2015

(65) Prior Publication Data

US 2016/0100429 A1    Apr. 7, 2016

Related U.S. Application Data

(63) Continuation of application No. 14/238,926, filed as application No. PCT/SE2012/050602 on Jun. 5, 2012, (Continued)

(30) Foreign Application Priority Data

Jan. 25, 2012    (WO) ................. PCT/SE2012/050071

(51) Int. Cl.
*H04W 74/00*    (2009.01)
*H04W 74/08*    (2009.01)
*H04W 24/10*    (2009.01)

(52) U.S. Cl.
CPC ......... *H04W 74/006* (2013.01); *H04W 24/10* (2013.01); *H04W 74/004* (2013.01); *H04W 74/008* (2013.01); *H04W 74/0833* (2013.01)

(58) Field of Classification Search
None
See application file for complete search history.

(56) References Cited

U.S. PATENT DOCUMENTS

2011/0134774 A1    6/2011  Pelletier et al.
2011/0243106 A1*  10/2011  Hsu ....................... H04L 5/0096
                                                              370/336

(Continued)

FOREIGN PATENT DOCUMENTS

CN    102036411    4/2011
CN    102118801    7/2011

(Continued)

OTHER PUBLICATIONS

Decision on Grant A Patent for Invention issued by the Federal Service on Intellectual Property (ROSPATENT) for Application No. 2014/109962 (English) Filing Date Jun. 5, 2012-Feb. 26, 2016,

(Continued)

*Primary Examiner* — Anh Ngoc Nguyen
(74) *Attorney, Agent, or Firm* — Baker Botts, LLP (57) ABSTRACT

A method in a base station for controlling a Random Access, RA, procedure is provided. The base station initiates (201) an RA procedure on a Secondary Cell, SCell, in a User Equipment, UE, by sending to the UE a Physical Downlink Control Channel, PDCCH, order for a RA procedure on the SCell. At initiation of RA, the base station starts (202) a timer in the base station. The timer is a timer for random access failure detection associated with said initiated RA procedure. If the RA procedure has not been completed before expiry of said timer, the base station sends (205) a command to the UE, commanding the UE to deactivate the SCell, and thereby stopping the RA procedure on the SCell.

28 Claims, 5 Drawing Sheets

Related U.S. Application Data now Pat. No. 9,247,565, which is a continuation of application No. PCT/SE2012/050071, filed on Jan. 25, 2012.

(60) Provisional application No. 61/523,459, filed on Aug. 15, 2011.

(56) References Cited

U.S. PATENT DOCUMENTS

| | | | | |
|---|---|---|---|---|
| 2012/0039223 A1* | 2/2012 | Chang | ................ | H04W 52/365 370/310 |
| 2013/0028198 A1* | 1/2013 | Yamada | ............ | H04W 56/0005 370/329 |

FOREIGN PATENT DOCUMENTS

| | | |
|---|---|---|
| CN | 102281626 | 12/2011 |
| RU | 2 232 469 | 8/1999 |
| WO | WO 00/14989 | 3/2000 |

OTHER PUBLICATIONS

Decision on Grant A Patent for Invention issued by the Federal Service on Intellectual Property (ROSPATENT) for Application No. 2014/109962 (Russian) Filing Date Jun. 5, 2012-Feb. 26, 2016.
3GPP TSG RAN WG2 #61bis; Shenzhen, China; Source: CATT; Title: Valid PRACH resource for dedicated preamble (R2-081672) Mar. 31-Apr. 4, 2008.
3GPP TSG-RAN WG2 #74; Barcelona, Spain; Source: InterDigital Communications; Title: Support for RACH on SCells in LTE CA (Tdoc R2-113258)—May 9-13, 2011.
Decision on Grant, A Patent for Invention issued by the Federal Service on Intellectual Property (ROSPATENT) for Application No. 2014109962 (English translation included)—Application filed Jun. 5, 2012.
PCT International Report on Patentability for International Application No. PCT/SE2012/050071 (Feb. 18, 2014).
PCT International Search Report for International Application No. PCT/SE2012/050071 (May 4, 2012).
3GPP TSG RAN WG2 #61bis; Shenzhen, China; Title: Valid PRACH resource for dedicated preamble (R2-081672) (Mar. 31-Apr. 4, 2008).
3GPP TSG-RAN WG2, Meeting #74; Barcelona, Spain; Title: Issues of Random Access Procedure on SCell (R2-112922) (May 9-13, 2011).
3GPP TSG-RAN WG2 meeting #60-bis; Sorrento, Italy; Title: SFN acquisition from the target cell (R2-081094) (Feb. 11-15, 2008).
3GPP TSG-RAN WG2 #74; Barcelona, Spain; Title: Support for RACH on SCells in LTE CA (May 9-13, 2011).
Official Action for Mexican Patent Application: MX/a/2014/001529; Serial No. PCT/SE2012/050602—U.S. Appl. No. 61/523,459 dated (Oct. 28, 2014).
PCT Written Opinion of the International Searching Authority for International Application No. PCT/SE2012/050602; International Filing Date: Jun. 5, 2012 (Aug. 8, 2012).
PCT International Search Report for International Application No. PCT/SE2012/050602; International Filing Date: Jun. 5, 2012 (Aug. 8, 2012).
3GPP TSG RAN WG2 Meeting #74 in Barcelona, Spain May 9-13, 2011 (R2-112922).
3GPP TSG RAN WG2 #61bis in Shenzhen, China Mar. 31-Apr. 4, 2008 (R2-081672).
3GPP TSG RAN WG2 #74 in Barcelona, Spain May 9-13, 2011 (Tdoc R2-113258).
3GPP TSG RAN WG2 meeting #60-bis in Sorrento, Italy, Feb. 11-15, 2008 (R2-081094).
3GPP TS 36.331; V10.2.0 (Jun. 2011) 3rd Generation Partnership Project; Technical Specification Group Radio Access Network; Evolved Universal Terrestrial Radio Access (E-UTRA); Radio Resource Control (RRC); Protocol specification (Release 10) (4 part pdf attached).
First Office Action issued by the Chinese Patent Office for Application No. 201280039758—Jan. 4, 2017.
3GPP TSG-RAN WG2 Meeting #74; Barcelona, Spain; Source: ASUSTeK; Title: Issues of Random Access procedure on SCell (R2-112922)—May 9-13, 2011.
3GPP TSG-RAN WG2 #74; Barcelona, Spain; Source: InterDigital Communications; Title: Support for RACH on SCells in LTE CA (R2-113258)—May 9-13, 2011.

* cited by examiner

CONTROLLING RANDOM ACCESS FAILURE ON A SECONDARY CELL

PRIORITY

This application is a continuation, under 35 U.S.C. §120, of U.S. application Ser. No. 14/238,926 filed Feb. 14, 2014, which is a national stage filing under 35 U.S.C. §371 of International Patent Application Serial No. PCT/SE2012/050602, filed Jun. 5, 2012 and entitled "Controlling Random Access Failure on A Secondary Cell," which claims the benefit of U.S. Provisional Application No. 61/523,459, filed Aug. 15, 2011 and entitled Method and Arrangement in a Telecommunication System," and International Patent Application Serial No. PCT/SE2012/050071, filed Jan. 25, 2012 and entitled "Controlling Random Access in Secondary Cells."

TECHNICAL FIELD

Embodiments herein relate to a base station, a method therein, a user equipment, and a method therein. In particular, it relates to a random access procedure.

BACKGROUND

Communication devices such as User Equipments (UE) are also known as e.g. mobile terminals, wireless terminals and/or mobile stations. User equipments are enabled to communicate wirelessly in a cellular communications network or wireless communication system, sometimes also referred to as a cellular radio system or cellular networks. The communication may be performed e.g. between two user equipments, between a user equipment and a regular telephone and/or between a user equipment and a server via a Radio Access Network (RAN) and possibly one or more core networks, comprised within the cellular communications network.

User equipments may further be referred to as mobile telephones, cellular telephones, Machine-to-Machine (M2M) devices, laptops, or surf plates with wireless capability, just to mention some further examples. The user equipments in the present context may be, for example, portable, pocket-storable, hand-held, computer-comprised, or vehicle-mounted mobile devices, enabled to communicate voice and/or data, via the RAN, with another entity, such as another user equipment or a server.

The cellular communications network covers a geographical area which is divided into cell areas, wherein each cell area being served by a base station, e.g. a Radio Base Station (RBS), which sometimes may be referred to as e.g. "base station", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. A cell may be used as a Primary Cell (PCell and a Secondary Cell (SCell) by a UE, for different carrier aggregation deployments and scenarios see 3GPP 36 300 Annex J. PCells and SCells will be discussed more in detail below. One base station, situated on the base station site, may serve one or several cells. Further, each base station may support one or several communication technologies. The base stations communicate over the air interface operating on radio frequencies with the user equipments within range of the base stations.

In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even base stations, may be directly connected to one or more core networks. The 3GPP has undertaken to evolve further the UTRAN and GSM based radio access network technologies.

3GPP LTE radio access standard has been written in order to support high bitrates and low latency both for uplink and downlink traffic. Data transmission is in LTE controlled by the radio base station.

LTE uses Orthogonal Frequency Division Multiplex (OFDM) in the downlink and Discrete Fourier Transform (DFT)-spread OFDM in the uplink. The basic LTE downlink physical resource may thus be seen as a time-frequency grid where each resource element corresponds to one OFDM subcarrier during one OFDM symbol interval.

In the time domain, LTE downlink transmissions are organized into radio frames of 10 ms, each radio frame consisting of ten equally-sized subframes of length $T_{subframe}=1$ ms.

Furthermore, the resource allocation in LTE is typically described in terms of Resource Blocks (RB), where a resource block corresponds to one slot, 0.5 ms, in the time domain and 12 contiguous subcarriers in the frequency domain. A pair of two adjacent resource blocks in time direction, 1.0 ms is known as a resource block pair. Resource blocks are numbered in the frequency domain, starting with 0 from one end of the system bandwidth.

The notion of Virtual Resource Blocks (VRB) and Physical Resource Blocks (PRB) has been introduced in LTE. The actual resource allocation to a UE is made in terms of VRB pairs. There are two types of resource allocations, localized and distributed. In the localized resource allocation, a VRB pair is directly mapped to a PRB pair, hence two consecutive and localized VRB are also placed as consecutive PRBs in the frequency domain. On the other hand, the distributed VRBs are not mapped to consecutive PRBs in the frequency domain, thereby providing frequency diversity for data channel transmitted using these distributed VRBs.

Downlink transmissions are dynamically scheduled, i.e. in each subframe the base station transmits control information about to which user equipments data is transmitted and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also comprises Common Reference Symbols (CRS), which are known to the receiver and used for coherent demodulation of e.g. the control information.

Carrier Aggregation

The LTE Rel-10 specifications have recently been standardized, supporting Component Carrier (CC) bandwidths up to 20 MHz, which is the maximal LTE Rel-8 carrier bandwidth. Hence, an LTE Rel-10 operation wider than 20 MHz is possible and appear as a number of LTE carriers to LTE Rel-10 user equipment.

In particular for early LTE Rel-10 deployments it can be expected that there will be a smaller number of LTE Rel- 10-capable user equipments compared to many LTE legacy user equipments. Therefore, it is necessary to assure an efficient use of a wide carrier also for legacy user equipments, i.e. that it is possible to implement carriers where legacy user equipments can be scheduled in all parts of the wideband LTE Rel-10 carrier. The straightforward way to obtain this would be by means of Carrier Aggregation (CA). CA implies that an LTE Rel-10 user equipment can receive multiple CC, where the CC have, or at least the possibility to have, the same structure as a Rel-8 carrier.

The Rel-10 standard support up to five aggregated carriers where each carrier is limited in the 3GPP Radio Frequency (RF) specifications to have a one of six bandwidths namely 6, 15, 25, 50, 75 or 100 RB, corresponding to 1.4, 3 5 10 15 and 20 MHz respectively.

The number of aggregated CC as well as the bandwidth of the individual CC may be different for uplink and downlink. A symmetric configuration refers to the case where the number of CCs in downlink and uplink is the same whereas an asymmetric configuration refers to the case that the number of CCs is different. It is important to note that the number of CCs configured in the network may be different from the number of CCs seen by a user equipment: A user equipment may for example support more downlink CCs than uplink CCs, even though the network offers the same number of uplink and downlink CCs.

During initial access a LTE Rel-10 user equipment behaves similar to a LTE Rel-8 user equipment. Upon successful connection to the network a user equipment may, depending on its own capabilities and the network, be configured with additional CCs in the UL and DL. Configuration is based on Radio Resource Control (RRC). The Radio Resource Control (RRC) protocol belongs to the UMTS Wideband Code Division Multiple Access, (WCDMA) protocol stack and handles the control plane signalling of Layer 3 between the UEs (User Equipment) and the UTRAN. Due to the heavy signaling and rather slow speed of RRC signaling it is envisioned that a user equipment may be configured with multiple CCs even though not all of them are currently used. If a user equipment is activated on multiple CCs this would imply it has to monitor all DL CCs for the Physical Downlink Control Channel (PDCCH) and the Physical Downlink Shared Channel (PDSCH). This implies a wider receiver bandwidth, higher sampling rates, etc. resulting in high power consumption.

Component Carrier Types

Initially, the user equipment will be configured with one UL/DL pair of component carriers, on which it made the initial random access. These component carriers are together called the Primary Cell (PCell). In addition to the PCell, the base station may configure the user equipment with additional serving cells, so called Secondary Cells (SCells) as extra resource when needed.

The UL PCell is configured with Physical Uplink Control Channel (PUCCH) and used for transmission of Layer 1 (L1) uplink control information. This also includes Channel State Information (CSI) for the DL transmission on the activated SCells.

The PCell cannot be deactivated. Non-Access Stratus (NAS) information is taken from the PCell. When the DL PCC experiences Radio Link Failure (RLF), Re-establishment of the UEs RRC connection will be triggered, regardless of the RLF status on the other DL CCs.

An SCell may be configured with a downlink and optionally an uplink. The UE may use only downlink and is therefore only optionally configured with an uplink. Thus, from user equipment point of view, the PCell is a UL/DL pair of component carriers, while the SCell may be one DL and optionally an UL. From a base station point of view a cell have an UL and a DL. But if a UE is configured with an SCell with a DL only, the UE will only use the DL of the cell even though other UEs using the same cell of the same base station may utilize both the UL and the DL of the cell.

The SCells are per default deactivated when added, but may be activated and deactivated. This activation/deactivation mechanism is implemented in the Medium Access Control (MAC) layer and can be applied to one or more SCells at the time.

When a downlink SCell is not active, the user equipment does not need to receive the corresponding PDCCH or PDSCH, nor is it required to perform Channel Quality Indication (CQI) measurements. It is also not allowed to perform any UL transmissions.

The user equipment may be configured with one or more, up to four SCells.

Random Access

In LTE, as in any communication system, a user equipment may need to contact the network via the base station without having a dedicated resource in the Uplink. To handle this, a Random Access (RA) procedure is available where a user equipment that does not have a dedicated UL resource may transmit a signal to the base station. The first message of this procedure is typically transmitted on a special resource reserved for random access, a Physical Random Access Channel (PRACH). This channel may for instance be limited in time and/or frequency, as in LTE. The resources available for PRACH transmission is provided to the user equipments as part of the broadcasted system information, or as part of dedicated RRC signaling in case of e.g. handover.

In LTE, the random access procedure may be used for a number of different reasons. Among these reasons are
 Initial access, for UEs in the LTE_IDLE or LTE_DETACHED states
 Incoming handover
 Resynchronization of the UL
 Scheduling request, for a user equipment that is not allocated any other resource for contacting the base station
 Positioning In the contention-based random access procedure used in LTE the user equipment starts the random access procedure by randomly selecting one of the preambles available for contention-based random access. The user equipment then transmits the selected random access preamble on the PRACH to the base station in RAN, this message is sometimes referred to as MSG1. MSG1 is short for "random access message 1" which is the message in which the random access preamble is transmitted.

The RAN acknowledges any preamble it detects by transmitting a random access response referred to as MSG2, including an initial grant to be used on the uplink shared channel, a temporary Cell (C)-Radio Network Temporary Identity (RNTI), and a Time Alignment (TA) update based on the timing offset of the preamble measured by the base station on the PRACH. The MSG2 is transmitted in the DL to the UE and its corresponding PDCCH message CRC is scrambled with the RA-RNTI. RNTI values are used primarily by the base station Physical Layer for scrambling the coded bits in each of the code words to be transmitted on the physical channel. The different RNTI values used to identify the UE are defined in 3GPP TS 36.300, section 8.1.

When receiving the response, the user equipment uses the grant to transmit a message referred to as MSG3 that in part is used to trigger the establishment of radio resource control and in part to uniquely identify the user equipment on the common channels of the cell. The timing alignment command provided in the random access response is applied in the UL transmission in MSG3. The base station may change the resources blocks that are assigned for a MSG3 transmission by sending an UL grant that's CRC is scrambled with a Temporary (T) C-RNTI. The MSG4 which is then contention resolution has its PDCCH CRC scrambled with the C-RNTI if the user equipment previously has a C-RNTI assigned. If the user equipment does not have a C-RNTI previously assigned its PDCCH CRC is scrambled with the TC-RNTI.

The procedure ends with RAN solving any preamble contention that may have occurred for the case that multiple user equipments transmitted the same preamble at the same time. This may occur since each user equipment randomly selects when to transmit and which preamble to use. If multiple user equipments select the same preamble for the transmission on Random Access Channel (RACH), there will be contention between these user equipments that needs to be resolved through the contention resolution message referred to as MSG4. An example of the case when contention occurs is where two user equipments transmit the same preamble, p5, at the same time. A third user equipment also transmits at the same RACH, but since it transmits with a different preamble, p1, there is no contention between this user equipment and the other two user equipments.

The user equipment may also perform non-contention based random access. A non-contention based random access or contention free random access may e.g. be initiated by the base station to get the user equipment to achieve synchronisation in UL. The base station initiates a non-contention based random access either by sending a PDCCH order or indicating it in an RRC message. The later of the two is used in case of handover.

The base station may also order the user equipment through a PDCCH message to perform a contention based random access. In the procedure for the user equipment to perform contention free random access, the MSG2 is transmitted in the DL to the user equipment and its corresponding PDCCH message CRC is scrambled with the RA-RNTI, similar to the contention based random access. The user equipment considers the contention resolution successfully completed after it has received MSG2 successfully.

For the contention free random access as for the contention based random access, the MSG2 does contain a timing alignment value. This enables the base station to set the initial/updated timing according to the user equipments transmitted preamble.

In LTE Rel-10, the random access procedure is limited to the primary cell only. This implies that the user equipment may only send a preamble on the primary cell. Further MSG2 and MSG3 is only received and transmitted on the primary cell. MSG4 may however in Rel-10 be transmitted on any DL cell.

In LTE Rel-11, the current assumption is that the random access procedure will be supported also on secondary cells, at least for the user equipments supporting LTE Rel-11 carrier aggregation. Only network initiated random access on SCells is assumed.

Random Access Failure in Rel-10 and Earlier Releases

When random access fails continuously on the PCell, the maximum number of expected transmission attempts of MSG1, which is the transmission of the Random Access (RA) preamble on PCRACH, preambleTransMax, will be exceeded. When the preambleTransMax threshold is exceeded, the user equipment will indicate a random access problem to higher layers. This will lead to that the user equipment declares radio link failure on the PCell. preambleTransMax is defined in TS 3GPP 36.331 as part of the RACH-ConfigCommon IE as follows: "Maximum number of preamble transmission in TS 36.321. Value is an integer. Value n3 corresponds to 3, n4 corresponds to 4 and so on."

For contention free random access this is the maximum number of retransmissions using the assigned preamble. For the contention based random access this is the maximum number of retransmissions where for each retransmission a preamble is selected according to the preamble selection method specified in 3GPP TS 36.321.

preambleTransMax may be exceeded either at reception of Random Access Response, MSG2, or at reception of the contention resolution message, MSG4. The procedural details for random access failure on the PCell are described in 3GPP 36.321, chapter 5.1.4 and 5.1.5.

A UE is currently prevented from performing an infinite number of random access re-attempts by triggering Radio Link Failure (RLF).

For SCells there is currently no radio link monitoring and the UE can thus not declare radio link failure on an SCell. Declaring RLF on the PCell as a result of continuous random access failure on an SCell does not seem like a good solution. And introducing RLF/RLM on SCells would mean introducing higher complexity and more error cases.

Hence it seems that the method which is currently applied for the PCell to prevent random access failure from continuing infinitely is not suitable also for SCells. Also, no other known method for preventing an infinite number of RA attempts on the SCell exists.

SUMMARY

It is therefore an object of embodiments herein to provide a way of protecting the user equipment and the network from re-attempting random access infinitely.

According to a first aspect of embodiments herein, the object is achieved by a method in a base station for controlling a Random Access, RA, procedure. The base station initiates an RA procedure on a Secondary Cell, SCell, in a User Equipment, UE, by sending to the UE a Physical Downlink Control Channel, PDCCH, order for a RA procedure on the SCell. At initiation of RA, the base station starts a timer in the base station. The timer is a timer for random access failure detection associated with said initiated RA procedure. If the RA procedure has not been completed before expiry of said timer, the base station sends a command to the UE, commanding the UE to deactivate the SCell, and thereby stopping the RA procedure on the SCell.

According to a second aspect of embodiments herein, the object is achieved by a method in a User Equipment, UE, for controlling a Random Access, RA, procedure. The UE is operable to perform RA procedure in both a Primary cell, PCell, and in at least one Secondary Cell, SCell, The UE receives from a base station, a Physical Downlink Control Channel, PDCCH, order for an RA procedure on an SCell in the UE. The UE then performs the RA procedure on the SCell according to the PDCCH order. The UE receives a command from the base station. The command commands the UE to deactivate the SCell. The UE then stops the RA procedure on the SCell and deactivates the SCell according to the command.

According to a third aspect of embodiments herein, the object is achieved by a base station for controlling a Random Access, RA, procedure. The base station comprises a processing circuitry configured to initiate an RA procedure on a Secondary Cell, SCell, in a User Equipment, UE, by sending to the UE a Physical Downlink Control Channel, PDCCH, order for a RA procedure on the SCell. The processing circuitry is further configured to, at initiation of the RA, start a timer in the base station. The timer is a timer for a random access failure detection associated with said initiated RA procedure. The processing circuitry is further configured to send a command to the UE if the RA procedure has not been completed before expiry of said timer, commanding the UE to deactivate the SCell, and thereby stop the RA procedure on the SCell.

According to a fourth aspect of embodiments herein, the object is achieved by a User Equipment, UE, for controlling a Random Access, RA, procedure. The UE is operable to perform RA procedure in both a Primary cell, PCell, and in at least one Secondary Cell, SCell. The UE comprises a processing circuitry configured to receive from a base station, a Physical Downlink Control Channel, PDCCH, order for an RA procedure on an SCell in the UE. The processing circuitry is further configured to perform the RA procedure on the SCell according to the PDCCH order. The processing circuitry is further configured to receive a command from the base station. The command commands the UE 120 to deactivate the SCell. The processing circuitry is further configured to stop the RA procedure on the SCell and deactivate the SCell according to the command.

Since the UE can stop the RA procedure on the SCell and deactivate the SCell upon a command from the base station, the user equipment, the base station and the network are protected from re-attempting random access infinitely in the SCell.

BRIEF DESCRIPTION OF THE DRAWINGS

Examples of embodiments herein are described in more detail with reference to attached drawings in which.

DETAILED DESCRIPTION

Embodiments herein relate to Random Access (RA) failure protection and will be exemplified in the following non-limiting description. The UE is according to embodiments herein prevented from performing an infinite number of random access re-attempts on an SCell.

As part of the development of embodiments herein a problem will first be identified and discussed.

As mentioned above, for SCells there is currently no Radio Link Monitoring (RLM) and the UE can thus not declare RLF on an SCell. Declaring RLF on the PCell as a result of continuous random access failure on an SCell does not seem like a good solution as it is not good to declare RLF on the PCell only because the SCell fails. If RLF was to be declared on one of the SCells it would need a separate handling compared to RLF of the PCell since the SCells are only additional resource, as it is not desired to declare RLF on the whole UE. Therefore, introducing RLF and/or RLM on SCells would mean introducing higher complexity and more error cases. Also this would be against the current understanding that the RLF is per UE rather than per specific serving cell.

Hence it seems that the method which is currently applied for the PCell to prevent RAF from continuing infinitely is not suitable also for SCells.

The object of embodiments herein is to protect the UE and the network from re-attempting random access infinitely.

Thus, embodiments herein comprises the realization that the prior art solution does not work for SCells, and the application of a mechanism that upon exceeding or reaching a threshold is to stop any ongoing random access procedures in the SCell which has an ongoing RA procedure. The current solution for the PCell does not stop the RA procedure, but indicates the problem to higher layers.

Figure 1:
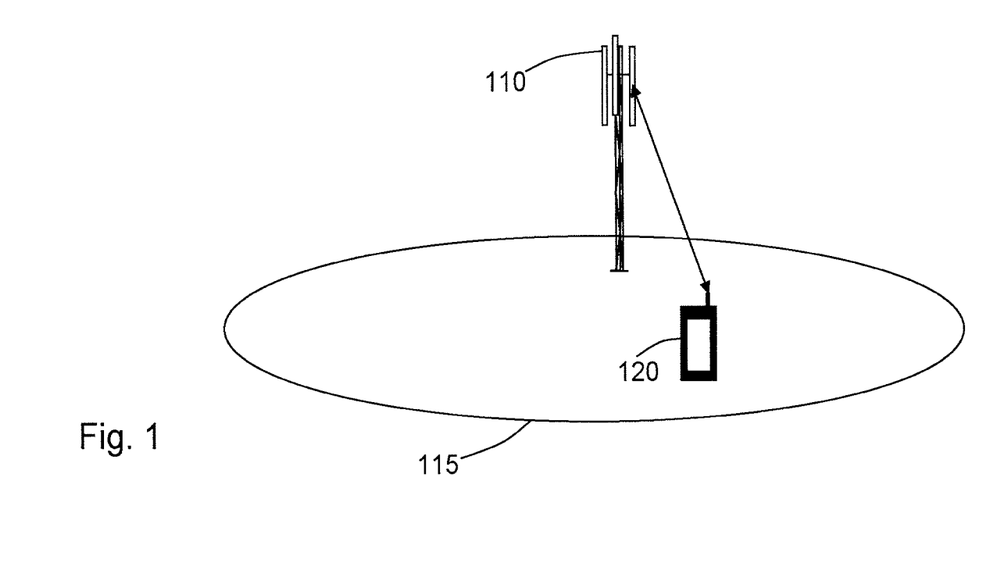
FIG. 1 is a schematic block diagram illustrating embodiments in a telecommunications system.

FIG. 1 depicts a telecommunications system 100 in which embodiments herein may be implemented. The telecommunications system 100 is a wireless communication network such as an LTE, WCDMA, GSM network, any 3GPP cellular network, Wimax, or any cellular network or system.

The telecommunications system 100 comprises one or more cells. In FIG. 1, a base station 110 is serving a cell 115. The base station 110 may be a radio base station such as e.g. a base station, an eNodeB, a relay eNodeB, or a Home Node B, and Home eNode B or any other network node capable to serve a user equipment or a machine type communication device in a cellular communications network.

A User Equipment (UE) 120 is located in the cell 115. The cell 115 may be used as a PCell or an SCell by the UE 120. The user equipment 120, may e.g. be a mobile user equipment or a wireless user equipment, a mobile phone, a computer such as e.g. a laptop, a Personal Digital Assistant (PDA), an M2M device or a tablet computer, sometimes referred to as a surf plate, with wireless capability, or any other radio network units capable to communicate over a radio link in a telecommunications system. The UE 120 is operable to perform RA in both a PCell and SCells.

Embodiments herein will first be discussed from a base station perspective.

An example of embodiments of a method in the base station 110 for controlling RA procedure will now be described with reference to a flowchart depicted in FIG. 2. The method comprises the following actions, which actions may be taken in any suitable order.

Figure 2:
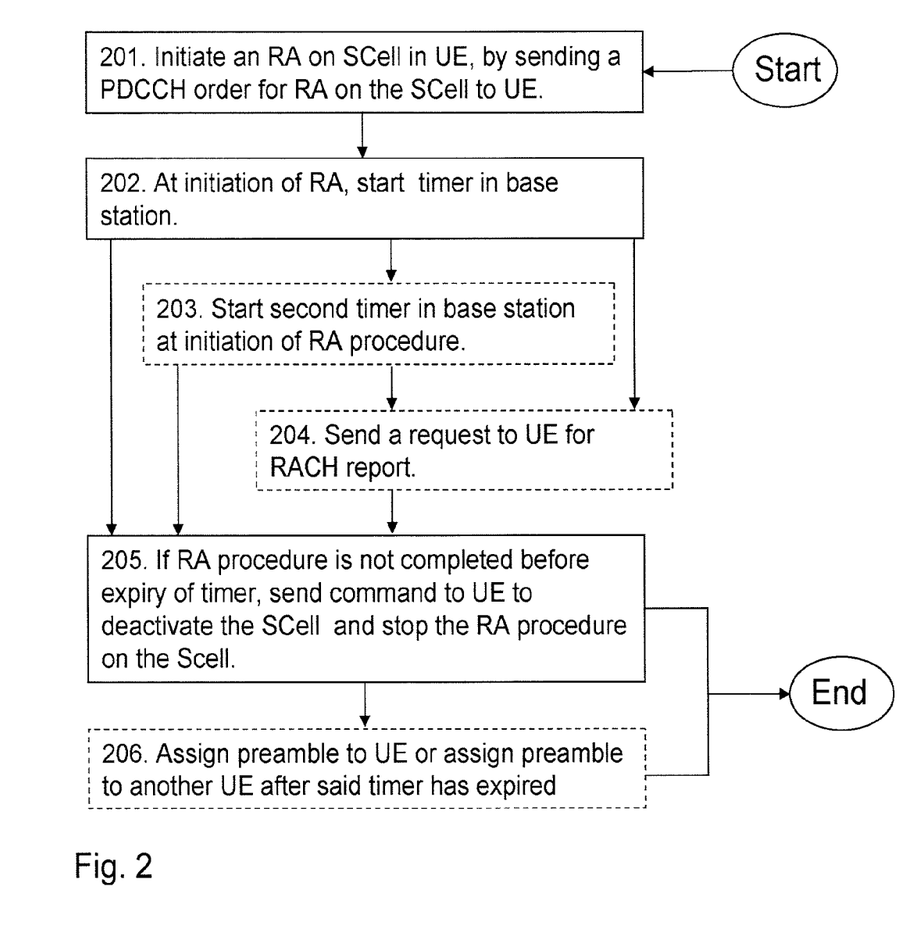
FIG. 2 is a flowchart depicting embodiments of a method in a base station.

Dashed lines of some boxes in FIG. 2 indicate that this action is not mandatory.

Action 201

The base station 110 initiates an RA procedure on an SCell, in the UE 120, by sending to the UE 120 a PDCCH order for an RA procedure on the SCell.

This may be triggered by for example Handover, DL data transfer, positioning or for the purpose of time alignment.

Action 202

At initiation of RA, the base station 110 starts a first timer in the base station 110. The first timer is a timer for a random access failure detection associated with said initiated RA procedure. The first timer may be referred to as a preamble validity timer. The first timer is started to keep track of when the RA of the SCell has been going on long enough for it to be expected to be unsuccessful and therefore should be stopped and the SCell deactivated.

Action 203

This is an optional action. According to some embodiments the base station 110 starts a second timer in the base station 110, at initiation of RA procedure. This may be used to upon expiry of the second timer, trigger the next action 204 of requesting a RACH report of the UE 120.

In some embodiments, the first timer started in action 202 is further a timer for RA monitoring on a PCell and this second timer is used so that the base station 110 will know when it should send the RACH report request to find out mainly the RACH status of SCells.

Action 204

This is an optional action. The base station 110 may send a request to the UE 120 requesting a RACH report. This is to find out how the RA is proceeding, i.e. if it has been successful or not. The RACH report request may specify which cell or cells out of the serving cells of the UE 120 the RACH report is requested for, e.g. by using Cell Index in an information request message. In some embodiments wherein the second timer has been started in action 203, this action of requesting the RACH report, is performed after said second timer has expired.

Action 205

If the RA procedure has not been completed before expiry of said first timer, the base station 110 sends a command to the UE 120, commanding the UE 120 to deactivate the SCell, and thereby stopping the RA procedure on the SCell.

In some embodiments, this action of sending the deactivation command to the UE 120 is performed when the base station 110 has received the requested RACH report from the UE 120 and when the report comprises information indicating that the SCell should be deactivated. The information may for example comprise information about the status, progress, successfulness, and/or unsuccessfulness of the RA which the UE 120 is performing or has been performing on the serving cells which were indicated in the RACH report request.

For example, the UE 120 may report UE information according to the specified cell. If no value indicating a specific cell is specified by the base station, the UE 120 may e.g. report according to the latest random access attempt, or report according to the latest random access attempt on the PCell.

Depending on the information the base station 120 receives in this message, it may make the decision to deactivate the SCell. In one embodiment, the base station 110 may in combination with this method implement timer i.e. the second timer, to be started at the PDCCH order for RACH, and upon whose expiry the base station could request this information.

Action 206

The PDCCH order may comprise a dedicated preamble. In this action the base station 110 may assign said preamble to the UE 120 to use for said SCell or another serving cell of the UE 120 after said first timer has expired. Or as an alternative, the base station 110 may assign said preamble to another UE after said first timer has expired.

If a dedicated preamble is included in the PDCCH order this means that the base station 110 knows throughout the RA who this UE is, since the dedicated preamble works as a unique id. This type of RA therefore have less steps than RA performed by a UE which is not assigned a dedicated preamble. Also when the UE is not assigned a preamble the RA could fail if multiple UEs picks the same preamble when starting their RA.

Figure 3:
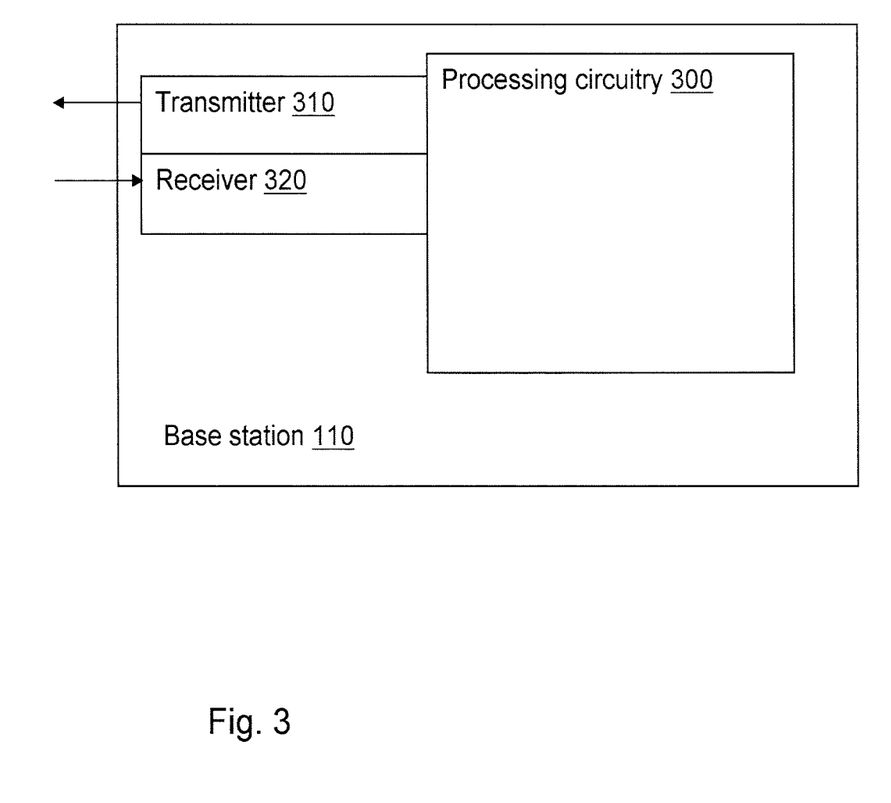
FIG. 3 is a schematic block diagram illustrating embodiments in a base station . . . .

To perform the method actions for controlling the RA, procedure described above in relation to FIG. 2, the base station 110 comprises the following arrangement depicted in FIG. 3.

The base station 110 comprises a processing circuitry 300 configured to initiate RA procedure on an SCell in the UE 120 by sending to the UE 120 a PDCCH order for a RA procedure on the SCell. The base station 110 comprises one or more transmitters 310 and one or more receivers 320. The sending may be performed via the one or more transmitters 310.

In some embodiments, the order comprises a dedicated preamble.

The processing circuitry 300 is further configured to start a first timer in the base station 110 at initiation of the RA. The first timer is a timer for a random access failure detection associated with said initiated RA procedure. In some embodiments the first timer is a preamble validity timer.

The processing circuitry 300 is further configured to, if the RA procedure has not been completed before expiry of said first timer, send a command to the UE 120, commanding the UE 120 to deactivate the SCell, and thereby stopping the RA procedure on the SCell. The sending may be performed via the transmitter 310.

In the embodiments wherein the order comprises a dedicated preamble, the processing circuitry 300 may further be configured to, after said first timer has expired, assign said preamble to the UE 120 to use for said SCell or another serving cell of the UE 120. Or as an alternative, assign said preamble to another UE after said first timer has expired.

The processing circuitry 300 may further be configured to send a request to the UE 120 requesting a RACH report. The sending may be performed via the transmitter 310. In these embodiments the processing circuitry 300 may further be configured to send the command to the UE 120 when the base station 110 has received the requested RACH report from the UE 120 and when the report comprises information indicating that the SCell should be deactivated.

The RACH report request may specify which cell or cells out of the serving cells of the UE 120 the RACH report is requested for e.g. by using Cell Index in an information request message.

In some embodiments, the processing circuitry 300 is further configured to start a second timer in the base station 110 at initiation of RA procedure.

In these embodiments, the processing circuitry 300 may further be configured to send the request to the UE 120 requesting the RACH report, after said second timer has expired.

The method steps performed by the UE 120 are performed by functional elements of the processing circuitry 300. In some embodiments these functions are carried out by appropriately programmed microprocessors or microcontrollers, alone or in conjunction with other digital hardware, which may include Digital Signal Processors (DSPs), special-purpose digital logic, and the like. Either or both of the microprocessors and digital hardware may be configured to execute program code stored in memory. Again, because the various details and engineering tradeoffs associated with the design of baseband processing circuitry for mobile devices and wireless base stations are well known and are unnecessary to a full understanding of the invention, additional details are not shown here.

Program code stored in the memory circuit may comprise one or several types of memory such as Read-Only Memory (ROM), random-access memory, cache memory, flash memory devices, optical storage devices, etc., and includes program instructions for executing one or more telecommunications and/or data communications protocols, as well as instructions for carrying out one or more of the techniques described herein, in several embodiments. Of course, it will be appreciated that not all of the steps of these techniques are necessarily performed in a single microprocessor or even in a single module.

Embodiments herein will now be discussed from a UE perspective.

Figure 4:
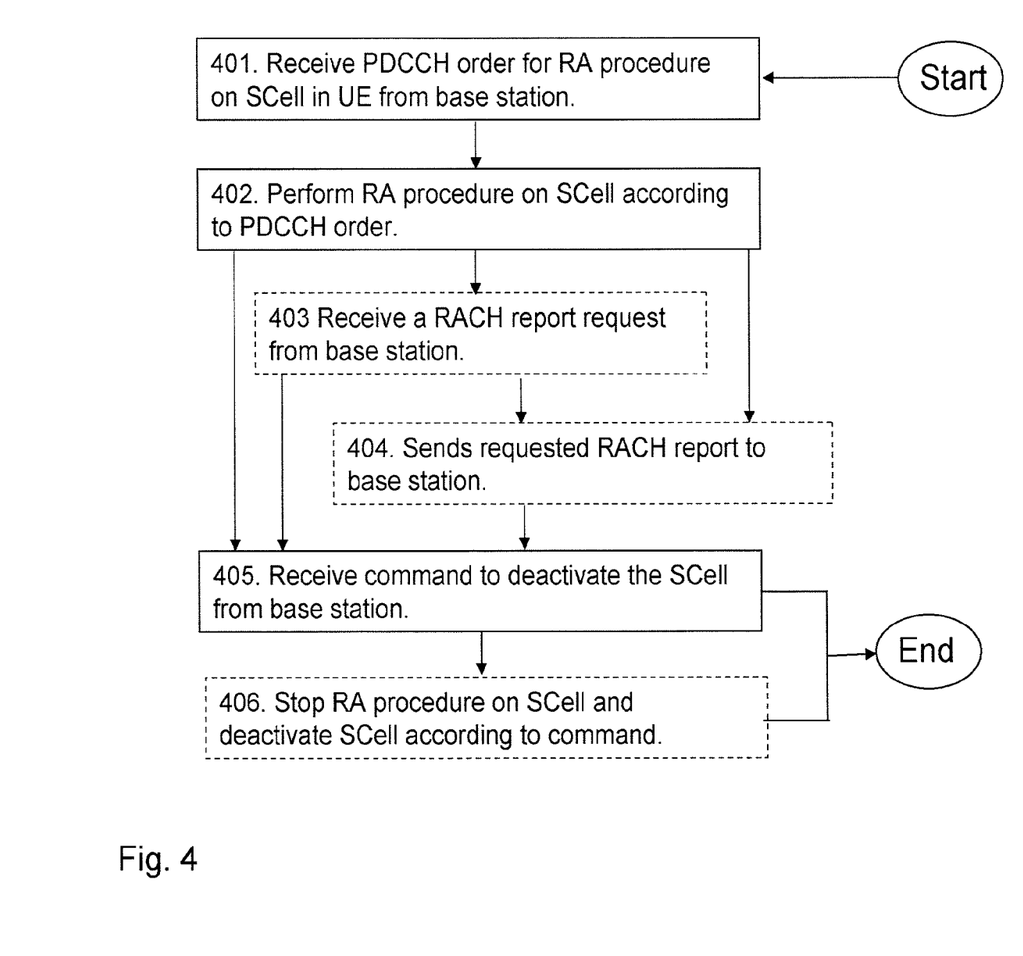
FIG. 4 is a flowchart depicting embodiments of a method in a user equipment.

An example of embodiments of a method in the UE 120 for controlling an RA procedure will now be described with reference to a flowchart depicted in FIG. 4. The UE 120 is operable to perform RA procedure in both a PCell and in at least one SCell. The method comprises the following actions, which actions may be taken in any suitable order. Dashed lines of some boxes in FIG. 4 indicate that this action is not mandatory.

Action 401

The UE120 receives from the base station 110, a PDCCH order for an RA procedure on an SCell in the UE 120.

Action 402

The UE120 starts the RA procedure on the SCell according to the PDCCH order.

Action 403

In some embodiments, the UE 120 receives a request from the base station 110 requesting a RACH report.

The RACH report request may specify which cell or cells out of the serving cells of the UE 120 the RACH report is requested for, e.g. by using Cell Index in an information request message.

Action 404

In the embodiments where the UE 120 receives a request for a RACH report from the base station 110, the UE 120 sends the requested RACH report to the base station 110. The report may be based on the cell or cells out of the serving cells of the UE 120 the RACH report is requested for.

The RACH report to be sent to the base station 110 may e.g. be performed according to the latest random access attempt in the UE 120, or according to the latest random access attempt in the UE 120 on the PCell.

For example, the existing mechanism to report RACH information in the UE information response message, see 3GPP TS 36.331 ch 6.2.2, may be reused, to reusing an existing UE information response message to provide information about an unsuccessful RA on the SCell. Then the base station 110 may send a UE information request message to the UE 120. In this message, the base station 110 may specify which cell such as PCell or SCell, potentially using the Cell Index, SCellIndex or ServCellIndex of 3GPP TS 36.331, that it requests a RACH report for, e.g. as an optional information element.

As mentioned above, the UE 120 may report UE information according to the specified cell. And if no value indicating a specific cell is specified by the base station, the UE 120 may report according to the latest random access attempt or report according to the latest random access attempt on the PCell. Depending on the information the base station 120 receives in this message, it may make the decision to deactivate the SCell. In one embodiment, the base station 110 may in combination with this method implement a timer to be started at the PDCCH order for RACH, and upon whose expiry the base station could request this information.

Action 405

The UE120 receives a command from the base station 110, commanding the UE 120 to deactivate the SCell.

Action 406

The UE120 stops the RA procedure on the SCell and deactivates the SCell according to the command.

In this way the UE, the base station 110 and the network is protected from re-attempting random access infinitely.

Figure 5:
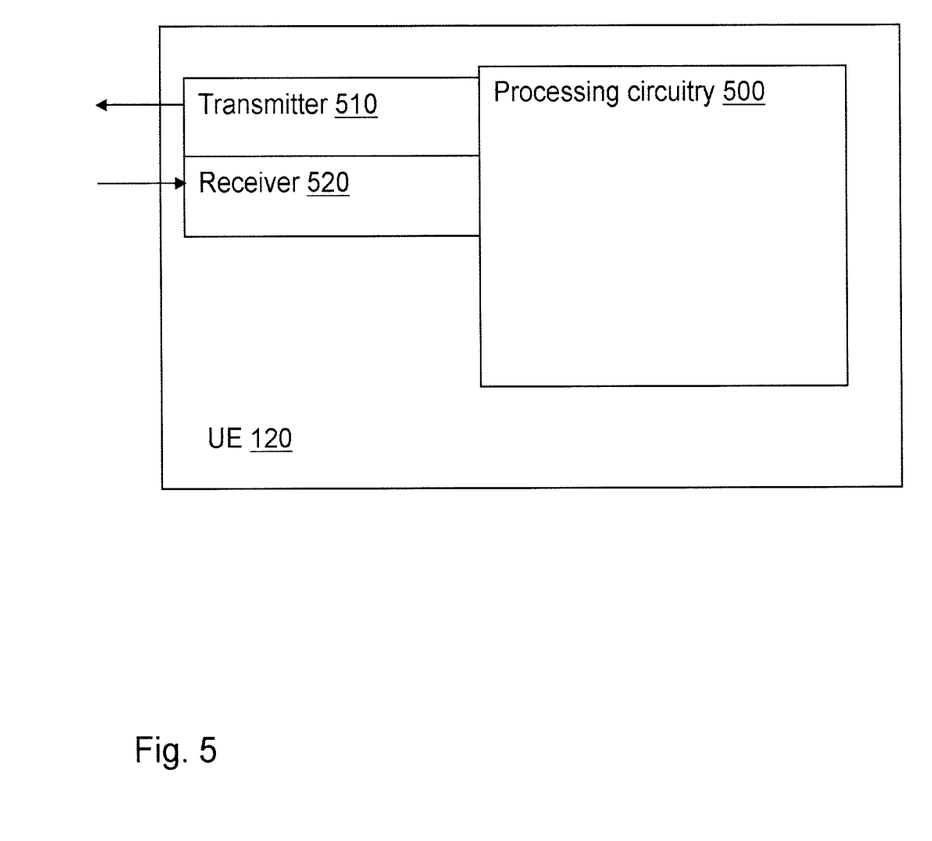
FIG. 5 is a schematic block diagram illustrating embodiments of a user equipment.

To perform the method actions for controlling the RA procedure described above in relation to FIG. 4, the base station 110 comprises the following arrangement depicted in FIG. 5. As mentioned above, the UE 120 is operable to perform RA procedure in both a PCell and in at least one SCell.

The UE 120 comprises a processing circuitry 500 configured to receive from a base station 110, a PDCCH order for an RA procedure on an SCell in the UE 120. The UE 110 comprises a transmitter 510 and a receiver 520. The PDCCH order may be received via the transmitter 510.

The processing circuitry 500 is further configured to perform the RA procedure on the SCell according to the PDCCH order.

The processing circuitry 500 is further configured to receive a command from the base station 110. The command commands the UE 120 to deactivate the SCell. The command may be received via the receiver 520.

The processing circuitry 500 is further configured to stop the RA procedure on the SCell and deactivate the SCell according to the command.

In some embodiments, the processing circuitry 500 is further configured to receive a request from the base station 110 requesting a RACH report. The request may be received via the receiver 520.

In these embodiments the processing circuitry 500 may further be configured to send the requested RACH report to the base station 110. The RACH report may be sent via the transmitter 510.

The RACH report request may specify which cell or cells out of the serving cells of the UE 120 the RACH report is requested for e.g. by using Cell Index in an information request message.

The RACH report may be sent to the base station 110 e.g. according to the latest random access attempt in the UE 120, or according to the latest random access attempt in the UE 120 on the PCell.

The method steps performed by the base station 110 are performed by functional elements of the processing circuitry 500. In some embodiments these functions are carried out by appropriately programmed microprocessors or microcontrollers, alone or in conjunction with other digital hardware, which may include Digital Signal Processors (DSPs), special-purpose digital logic, and the like. Either or both of the microprocessors and digital hardware may be configured to execute program code stored in memory. Again, because the various details and engineering tradeoffs associated with the design of baseband processing circuitry for mobile devices and wireless base stations are well known and are unnecessary to a full understanding of the invention, additional details are not shown here Program code stored in the memory circuit may comprise one or several types of memory such as Read-Only Memory (ROM), random-access memory, cache memory, flash memory devices, optical storage devices, etc., and includes program instructions for executing one or more telecommunications and/or data communications protocols, as well as instructions for carrying out one or more of the techniques described herein, in several embodiments. Of course, it will be appreciated that not all of the steps of these techniques are necessarily performed in a single microprocessor or even in a single module.

Accordingly, embodiments herein comprises an implementation where the base station 110 has a timer for detecting that the RA procedure is continuously failing.

Some embodiments comprise a method in the base station 110 for controlling RA comprising the step of:
- initiating random access on an SCell in the UE 120,
- at initiation of RA, starting a first timer;
- stopping ongoing RA procedures for said UE 120 if said first timer expires before RA is successfully completed.

The current assumption is that the base station 110 orders the RA for SCells. This may however not be the case in the future.

Thus, example of embodiments herein from base station perspective may comprise:

1) When sending a PDCCH order for RA, start a first timer in the base station 110.
  a. If the first timer expires before the RA is successfully completed, request deactivation of the SCell. Upon SCell deactivation, the UE 120 will stop all ongoing RA procedures for this SCell.
  b. Upon expiry of the first timer, the base station 110 knows that the UE 120 has stopped RA reattempts and that the preamble, if included in the PDCCH order, is no longer in use.

Upon sending a PDCCH order to the UE 120 for a RA on an SCell, the base station 110 starts a timer.

In one sub case of these embodiments all random access procedures associated with a specific SCell may be stopped at deactivation of said SCell. If the random access has not completed before expiry of said timer, the base station 110 may send a deactivation command to the UE 120 and the UE 120 will deactivate this SCell. If the random access completes while the timer is still running, the timer is stopped. In this way the base station can ensure that any random access retransmission does not continue infinitely.

In another sub case of these embodiments, the timer in the base station is configured such that the UE RA procedure has been stopped according to any of the UE embodiments above before the base station timer expires. For one UE embodiment, the base station timer is configured so that the preambleTransMax expected re-transmission interval>base station timer. preambleTransMax is a threshold for setting a maximum number of preamble re-transmissions, i.e. maximum RA re-attempts, by a UE. In LTE Release-8/9 when there is only the PCell, a UE will then declare RLF when the maximum number of attempts has been exceeded. For the SCells there is currently no such threshold defined, nor shall a UE declare RLF.

The timer in the base station 110 may be referred to as a preamble validity timer, i.e. the time during which a dedicated preamble is valid. The base station 110 will thus know that at expiry of its timer, that the UE 120 is no longer using the assigned preamble. This preamble may then be assigned to this UE 120 to use for another serving cell or to another UE. Also the base station 110 may upon expiry of this timer decide to deactivate said SCell or decide to send another PDCCH order starting a new random access procedure for this SCell.

In some embodiments, the timer of the base station is configured to expire before the UE 120 stops its random access procedure. But the timer would be configured to expire after the UE 120 has sufficient time to complete it successfully or complete it successfully after a certain number of retransmissions. This means that the timer should expire before the preambleTransMax has been reached, contrary to the case two paragraphs above. For this case, the base station 110 may send another PDCCH order to start a new random access procedure using the same dedicated preamble. This sub case may be repeated a number of times before falling back to either the embodiments listed above.

The present invention may, of course, be carried out in other ways than those specifically set forth herein without departing from essential characteristics of the invention. The present embodiments are to be considered in all respects as illustrative and not restrictive.

In this disclosure, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary details.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a base station for controlling a Random Access, RA, procedure comprising:
  initiating the RA procedure on a Secondary Cell, SCell, in a Terminal Device, TD, by sending to the TD an order for a RA procedure on the SCell,
  at initiation of RA, starting a timer in the base station, wherein said timer is a timer for random access failure detection associated with said initiated RA procedure,
  if the RA procedure has not been completed before expiry of said timer, sending a command to the TD, commanding the TD to deactivate the SCell, and thereby stopping the RA procedure on the SCell.

2. The method according to claim 1, wherein the timer is a preamble validity timer.

3. The method according to claim 1, wherein the order comprises a dedicated preamble, the method further comprising:
  after said timer has expired, assigning said preamble to the TD to use for said SCell or another serving cell of the TD.

4. The method according to claim 1, wherein the order comprises a dedicated preamble, the method further comprising:
  after said timer has expired, assigning said preamble to another TD.

5. The method according to claim 1, further comprising:
  sending a request to the TD requesting a Random Access Channel, RACH, report, and
  and wherein the sending of the command to the TD is performed when the base station has received the requested RACH report from the TD and when the report comprises information indicating that the SCell should be deactivated.

6. The method according to claim 5, wherein the RACH report request specifies which cell or cells out of the serving cells of the TD the RACH report is requested for.

7. The method according to claim 6, wherein the RACH report request specifies which cell the RACH report is requested for by using Cell Index in an information request message.

8. The method according to claim 5, further comprising:
at initiation of RA procedure, starting a second timer in the base station,
and wherein the sending of the request to the TD requesting the RACH report, is performed after said second timer has expired.

9. A method in a Terminal Device, TD, for controlling a Random Access, RA, procedure, which TD is operable to perform RA procedure in both a Primary cell, PCell, and in at least one Secondary Cell, SCell, the method comprising:
receiving from a base station, an order for the RA procedure on an SCell in the TD,
starting the RA procedure on the SCell according to the order,
receiving a command from the base station, which commands the TD to deactivate the SCell and thereby stop the RA procedure on the SCell, and
stopping the RA procedure on the SCell by and deactivating the SCell according to the command.

10. The method according to claim 9, further comprising:
receiving a request from the base station requesting a Random Access Channel, RACH, report, and
and sending the requested RACH report to the base station.

11. The method according to claim 10, wherein the RACH report request specifies which cell or cells out of the serving cells of the TD the RACH report is requested for.

12. The method according to claim 11, wherein the RACH report request specifies which cell the RACH report is requested for by using Cell Index in an information request message.

13. The method according to claim 10, wherein RACH report sent to the base station is performed according to the latest random access attempt in the TD.

14. The method according to claim 10, wherein RACH report sent to the base station is performed according to the latest random access attempt in the TD on the PCell.

15. A base station for controlling a Random Access, RA, procedure comprising:
the base station comprising a processing circuitry configured to initiate the RA procedure on a Secondary Cell, SCell, in a Terminal Device, TD, by sending to the TD an order for a RA procedure on the SCell,
which processing circuitry further is configured to, at initiation of the RA, start a timer in the base station, wherein said timer is a timer for random access failure detection associated with said initiated RA procedure, and
which processing circuitry further is configured to, if the RA procedure has not been completed before expiry of said timer, send a command to the TD, commanding the TD to deactivate the SCell, and thereby stopping the RA procedure on the SCell.

16. The base station according to claim 15, wherein the timer is a preamble validity timer.

17. The base station according to claim 15, wherein the order comprises a dedicated preamble, wherein the processing circuitry further is configured to, after said timer has expired, assign said preamble to the TD to use for said SCell or another serving cell of the TD.

18. The base station according to claim 15, wherein the order comprises a dedicated preamble, and
wherein the processing circuitry further is configured to, after said timer has expired, assign said preamble to another TD.

19. The base station according to claim 15,
wherein the processing circuitry further is configured to send a request to the TD requesting a Random Access Channel, RACH, report, and
wherein the processing circuitry further is configured to send the command to the TD when the base station has received the requested RACH report from the TD and when the report comprises information indicating that the SCell should be deactivated.

20. The base station according to claim 19, wherein the RACH report request specifies which cell or cells out of the serving cells of the TD the RACH report is requested for.

21. The base station according to claim 20, wherein the RACH report request specifies which cell the RACH report is requested for by using Cell Index in an information request message.

22. The base station according to claim 19,
wherein the processing circuitry further is configured to, at initiation of RA procedure, start a second timer in the base station, and
wherein the processing circuitry further is configured to send the request to the TD requesting the RACH report, after said second timer has expired.

23. A Terminal Device, TD, for controlling a Random Access, RA, procedure, which TD is operable to perform RA procedure in both a Primary cell, PCell, and in at least one Secondary Cell, SCell,
the TD comprising a processing circuitry configured to receive from a base station, an order for the RA procedure on an SCell in the TD,
which processing circuitry further is configured to start the RA procedure on the SCell according to the order,
which processing circuitry further is configured to receive a command from the base station, which commands the TD to deactivate the SCell and thereby stop the RA procedure on the SCell, and
which processing circuitry further is configured to stop the RA procedure on the SCell by and deactivating the SCell according to the command.

24. The TD according to claim 23,
wherein the processing circuitry further is configured to receive a request from the base station requesting a Random Access Channel, RACH, report, and
wherein the processing circuitry further is configured to send the requested RACH report to the base station.

25. The TD according to claim 24, wherein the RACH report request specifies which cell or cells out of the serving cells of the TD the RACH report is requested for.

26. The TD according to claim 25, wherein the RACH report request specifies which cell the RACH report is requested for by using Cell Index in an information request message.

27. The TD according to claim 24, wherein RACH report sent to the base station is performed according to the latest random access attempt in the TD.

28. The TD according to claim 24, wherein RACH report sent to the base station is performed according to the latest random access attempt in the TD on the PCell.

* * * * *

UNITED STATES PATENT AND TRADEMARK OFFICE
CERTIFICATE OF CORRECTION

PATENT NO. : 9,854,604 B2
APPLICATION NO. : 14/966644
DATED : December 26, 2017
INVENTOR(S) : Boström et al.

It is certified that error appears in the above-identified patent and that said Letters Patent is hereby corrected as shown below:

In the Specification

In Column 1, Line 7, delete "2014," and insert -- 2014, now Pat. No. 9,247,565, --, therefor.

In Column 1, Line 14, delete "Method" and insert -- "Method --, therefor.

In Column 4, Line 43, delete "Positioning" and insert -- Positioning. --, therefor.

In Column 7, Line 43, delete "station . . . ." and insert -- station. --, therefor.

In Column 9, Line 40, delete "base station 120" and insert -- base station 110 --, therefor.

In Column 11, Line 56, delete "station 120" and insert -- station 110 --, therefor.

In Column 12, Line 11, delete "UE 110" and insert -- UE 120 --, therefor.

In Column 12, Line 53, delete "here" and insert -- here. --, therefor.

In the Claims

In Column 14, Line 63, in Claim 5, delete "and wherein" and insert -- wherein --, therefor.

In Column 15, Line 31, in Claim 10, delete "and sending" and insert -- sending --, therefor.

Signed and Sealed this
Eleventh Day of September, 2018

Andrei Iancu
*Director of the United States Patent and Trademark Office*